D. JOHNSON.
Car Spring.
No. 26,905.
Patented Jan. 24, 1860.
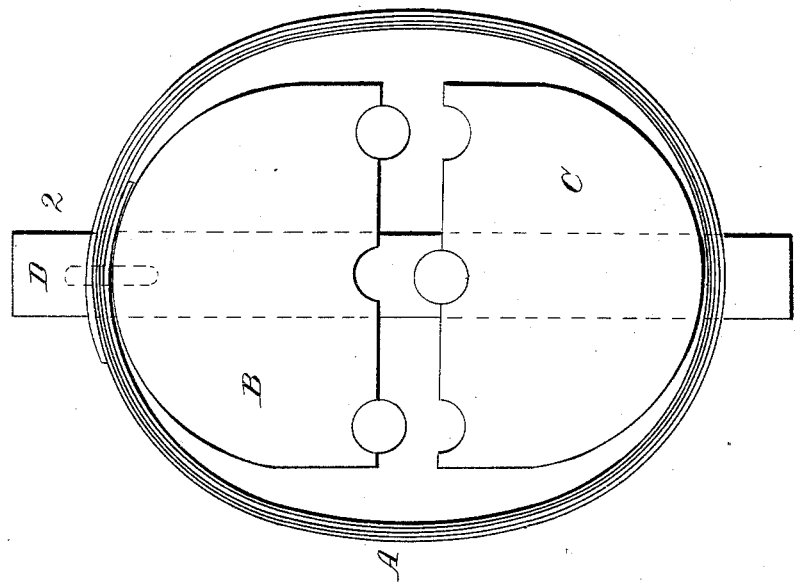
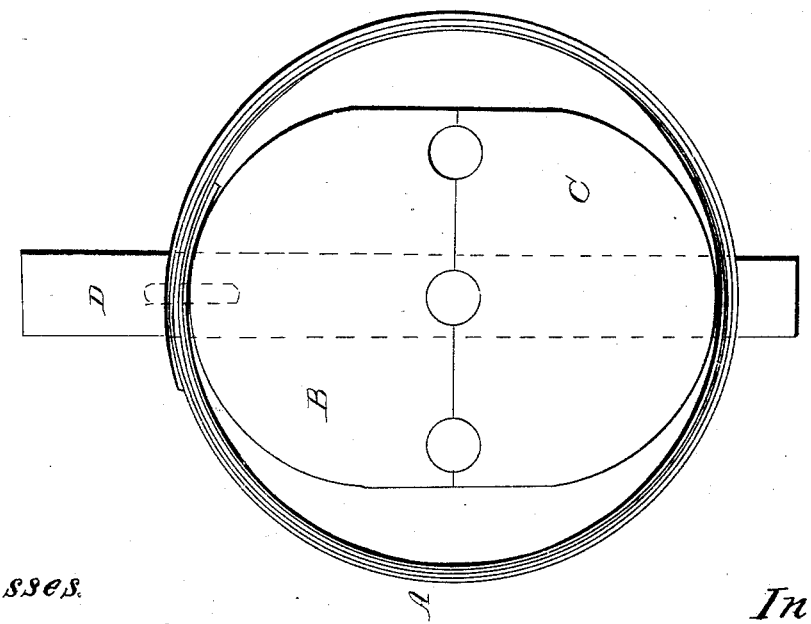
Witnesses.
Inventor.
Danforth Johnson

UNITED STATES PATENT OFFICE.

DANFORTH JOHNSON, OF CHICAGO, ILLINOIS.

SPRING FOR RAILWAY-CARS, &c.

Specification of Letters Patent No. 26,905, dated January 24, 1860.

*To all whom it may concern:*

Be it known that I, DANFORTH JOHNSON, of Chicago, State of Illinois, have invented and constructed a new and useful and improved spring for railway and other carriages, and for other uses and applications where springs are required; and I do hereby declare that the following is a full, clear, and exact description thereof, and of its construction and mode or manner of operation, reference being had to the accompanying drawings, and to the letters of reference marked thereon, making a part of this specification.

The distinguishing feature or character of my invention consists in producing or constructing a spring, which is generally endless or circular in form and which is composed or made up of one or more leaves arranged or laid upon each other, and to which power or pressure is applied from within to elongate it, and which shall have all the elasticity and quickness of vibration of the elliptic spring with vastly increased power, united with lightness of material, and cheapness of construction, with great durability.

Figure 1 represents a spring in its natural condition. Fig. 2 shows it as when pressure is applied to it.

The spring A, is formed of flat spring steel, of any desired or required thickness according to the uses to which applied, coiled or wound upon itself in a circular form or shape, a greater or less number of times, according to the power or strength required, the ends of which are clasped or bolted together, to keep the leaves in proper position, and better render available the elasticity of all such leaves. Within such a circular spring are placed two head blocks or supports B, and C, the length of each of which is about equal to the radius of the spring, and which meet each other at a central plane of the spring, as shown in Fig. 1.
The other ends of these supports are curved to fit, and press against the inner periphery of the spring. One of these blocks or supports is attached to the running gear of a carriage, or to one part of the thing to be acted on, and the other connects with the body of the carriage, &c.

In the drawing, the support B, is supposed to be firm, while the other C, is connected, through the bar D, with the thing intended to receive the elasticity of the spring. Such parts B, and C, are shaped substantially as represented, that is they are narrower than the diameter of the spring so as to allow of the elongation of the spring, hereafter mentioned. The stiffness or strength of the spring will also be varied, according as these parts B, C, are wider or narrower, and thus have a broader or narrower seat, upon the inner periphery of the spring A.

If now weight or pressure be applied to the bar D, connected with the head block c, its effect will be to elongate the spring, or draw it out into the general form of an ellipse, as seen in Fig. 2. The natural action or tendency of the spring will be to assume a circular form, but the head blocks B, and C, will prevent the spring reacting into an ellipse, the opposite of that shown in Fig. 2. The vibration of the spring will thus be caused by extending it into the form of an ellipse, and its action will be secured by thus extending or elongating it into an ellipse by means of pressure applied from within, and not from pressure applied from without to compress the circle. The effect of the pressure is therefore to produce an elliptic spring, and thus secure all the sensitiveness of that kind of spring. Such action however of the spring, as will be apparent is not confined necessarily to, or dependent upon, the completeness of the circle. The spring may be severed at its ends or sides upon the blocks B, and C, and still its action be the same: or the spring may be formed with different lengthened beams, in the same manner as the ordinary elliptic spring: the application of force or pressure from within to elongate the spring, instead of from without to compress is the most important feature of the invention.

By applying the pressure from within to elongate the spring, instead of from without the sustaining force of the spring is vastly increased. The mechanical difference between such application of power from within to elongate it, and from without, as in the ordinary elliptical spring, to compress it, is as power applied at the ends of a curved or elbow joint lever to extend it, the resistance being at the elbow joints, compared with power applied to the joint to press it down, resistance being at its ends. The position of the power applied does not however prejudicially affect or diminish the elasticity of the sensitiveness of the spring. Careful experiment proves that it will take many times as much power, applied from within as described to compress the sides or elongate the spring to the same extent, as when applied from without. The springs may be supported by the top or bottom block, as most convenient in particular cases; and it may be applied to all uses where springs are desired, from the largest to the smallest, fitted for a child's carriage or for any light service. They are peculiarly adapted for use on railway carriages, and will also prove unequaled as bumper springs. Under all circumstances they can be placed so as to receive pressure from any direction and their construction is simple and economical and not alone economical, but they have great durability. And as will be apparent from their character, great strength of spring can be secured with lightness of material.

What I claim as my invention and desire to secure by Letters Patent is—

1. The spring A, composed or made up of one or more leaves arranged or laid upon each other as described, when the power or pressure from within such circle is applied to elongate it, substantially as and for the purposes set forth.

2. I also claim in combination with such spring, the use and application of the head blocks or parts B, C, or their equivalents to elongate such spring as, and for the purposes set forth.

DANFORTH JOHNSON.

Witnesses:
H. W. ZIMMERMAN,
A. J. KNITELY.